United States Patent
Wang (10) Patent No.: US 9,852,366 B1
(45) Date of Patent: Dec. 26, 2017

(54) IMAGE PROCESSING AND ERROR HANDLING SYSTEM AND METHOD FOR PRINTING LINEARIZED AND NON-LINEARIZED PORTABLE DOCUMENT FORMAT (PDF) FILES

(71) Applicant: KYOCERA Document Solutions Inc., Osaka (JP)

(72) Inventor: Hui Wang, Temple City, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/253,174

(22) Filed: Aug. 31, 2016

(51) Int. Cl.
  *G06K 15/00* (2006.01)
  *H04N 1/00* (2006.01)
  *G06K 15/02* (2006.01)

(52) U.S. Cl.
  CPC ....... *G06K 15/408* (2013.01); *G06K 15/1807* (2013.01); *H04N 1/00015* (2013.01); *H04N 1/00042* (2013.01); *H04N 1/00063* (2013.01); *H04N 2201/0094* (2013.01)

(58) Field of Classification Search
  CPC ............. G06K 15/408; G06K 15/1807; H04N 1/00015; H04N 1/00042; H04N 1/00063
  USPC ....................................... 358/1.14
  See application file for complete search history.

(56) References Cited

U.S. PATENT DOCUMENTS

| | | | |
|---|---|---|---|
| 6,067,553 A | 5/2000 | Downs et al. | |
| 6,538,760 B1 | 3/2003 | deBry et al. | |
| 7,940,406 B2 | 5/2011 | Ozawa | |
| 9,508,316 B2* | 11/2016 | Liu | G09G 5/02 |
| 2005/0162682 A1* | 7/2005 | Aritomi | G06K 15/005 358/1.14 |
| 2005/0203919 A1* | 9/2005 | Deutsch | G06F 3/1211 |
| 2006/0256358 A1* | 11/2006 | Chapman | G06F 3/1206 358/1.13 |
| 2008/0288729 A1* | 11/2008 | Goel | G06F 17/21 |
| 2013/0208324 A1* | 8/2013 | Isoda | H04N 1/00 358/450 |
| 2016/0364497 A1* | 12/2016 | Xiong | G06F 17/30902 |

FOREIGN PATENT DOCUMENTS

| | | |
|---|---|---|
| JP | 2004-178097 | 6/2004 |
| JP | 2010-142980 | 1/2010 |

* cited by examiner

*Primary Examiner* — Allen H Nguyen
(74) *Attorney, Agent, or Firm* — Weiss & Moy, P.C.; Jeffrey D. Moy (57) ABSTRACT

A method of processing linearized and non-linearized Portable Document Format (PDF) files for printing comprises: determining by printer firmware if a printer driver detected that the PDF file is linearized; saving stream data of the PDF file by the printer firmware when the printer firmware determines the printer driver detected that the PDF file is linearized; and determining by the printer firmware if the PDF file is linearized when the PDF file is unidentified as being linearized by the printer driver, wherein the printer firmware identifies real and false linearization error during linearized processing and identifies and processes printing errors in a parallel manner during saving and interpreting stream data.

16 Claims, 12 Drawing Sheets

IMAGE PROCESSING AND ERROR HANDLING SYSTEM AND METHOD FOR PRINTING LINEARIZED AND NON-LINEARIZED PORTABLE DOCUMENT FORMAT (PDF) FILES

TECHNICAL FIELD

The present application in general relates to printing devices, and more specifically, to a PDF image forming system configured to interpret and print all PDF formats including non-linearized and linearized PDF formats at a designated printing speed and which has an error handling mechanism to improve error processing performance when an error happens during file receiving timing both for linearized and non-linearized PDF processing and avoid printing false error page which may occur during linear processing of a PDF file.

BACKGROUND

Portable Document Format (PDF) is a file format used to present and exchange documents independent of software, hardware, or operating system. A document converted to or saved as a PDF file generally has the option of being saved as a specific PDF standard. The PDF standard chosen is generally determined by the purpose for which the PDF document was created.

When printing a PDF file, a user may send PDF file data from a printer driver, using a network command (such as LPR) or USB printing. Printer firmware may need to handle all kinds of PDF formats such as PDF 1.2, 1.5, 1.7, as well as other PDF format types. For simplicity, PDF files may be defined as having two types of layouts: non-linearized and linearized.

Non-linearized PDF files may consume less disk space than linearized PDF files, though they may be slower to access because portions of the data required to assemble pages of the document may be scattered throughout the PDF file. Thus, printing a non-linearized PDF file may require the printer to wait until all the file data has been received because the important interpreting information may be located at the end of file.

Linearized PDF files (also called "optimized" or "web optimized" PDF files) may be constructed in a manner that enables them to be read in a Web browser plug-in without waiting for the entire file to download, since they are written to disk in a linear (as in page order) fashion. Linearized PDF files may contain a Linearization Parameter Dictionary in the beginning of the file to specify linearization information such as total file size (LSize), $1^{st}$ page size (1stPgSize) as well as other linearization information. In the Linearized PDF file, both the interpreting information and the $1^{st}$ page data are placed in the beginning of the file. Thus, printer firmware may start interpreting and printing the $1^{st}$ page data of the linearized PDF file without having to wait to receive the whole page data. Thus, linearized PDF files generally are expected to have a better printing performance than non-linearized PDF files.

It is possible to convert a non-linearized PDF file to a linearized PDF file. However, due to the limitation of the printer system memory configuration and printing speed, adding a linearized PDF converter to the printer firmware may be costly and slow down the printer speed. Further, it is necessary to support both formats in printer firmware as in some situations it may be more desirable to print the PDF file as a non-linearized PDF file as oppose to a linearized PDF file.

Therefore, it would be desirable to provide a system and method that overcomes the above. The system and method can interpret and print all PDF formats including non-linearized and linearized PDF formats. The system and method provides a linearized PDF format detection and conversion mechanism in different devices in the pipeline base on different PDF printing flows. The system and method provides an error handling mechanism in stream data storage to improve error handling performance and in interpreting PDF file to avoid printing false error page.

SUMMARY

In accordance with one embodiment, a method of processing linearized and non-linearized Portable Document Format (PDF) files for printing is disclosed. The method comprises: determining by printer firmware if a printer driver detected that the PDF file is linearized; saving and processing stream data of the PDF file by the printer firmware when the printer firmware determines the printer driver detected that the PDF file is linearized; and determining by the printer firmware if the PDF file is linearized when the PDF file is unidentified as being linearized by the printer driver.

In accordance with one embodiment, a method of processing linearized and non-linearized Portable Document Format (PDF) files for printing is disclosed. The method comprises: obtaining by a printer driver a file size of the PDF file; determining by the printer driver if the PDF file is linearized if the PDF file is sent to print via the printer driver, linearizing the PDF file by the printer driver when the PDF file is non-linearized; adding printer command information to the PDF file by the printer driver; sending the printer command information by the printer driver to printer firmware; determining by printer firmware if the printer driver detected that the PDF file is linearized; saving stream data of the PDF file by the printer firmware when the printer firmware determines the printer driver detected that the PDF file is linearized; determining by the printer firmware if the PDF file is linearized when the PDF file is unidentified as being linearized by the printer driver, identifying a linearization error by the printer firmware; and identifying and processing printing errors during saving and interpreting stream data by the printer firmware in a parallel manner.

In accordance with one embodiment, a system for processing linearized and non-linearized Portable Document Format (PDF) files for printing is disclosed. The system has a printer driver receiving the PDF file when the PDF file is sent to print via the printer driver, determining if the PDF file is linearized, linearizing the PDF file when the PDF file is non-linearized, and adding printer command information to the PDF file when linearizing the PDF file. A printer firmware module determines if the printer driver detected that the PDF file is linearized, linearizes the PDF file when the PDF file is unidentified as being linearized by the printer driver, processes the PDF file as linearized when a size difference between a linearized specific file size of the PDF file and a first page file size of the PDF file is greater than a threshold size, processes the PDF file as non-linearized when the size difference between the linearized specific file size of the PDF file and the first page file size of the PDF file is less than a threshold size, and processes the PDF file as non-linearized when a linearized key string is unidentified in the first portion of the PDF file received, wherein the printer firmware identifies real and false linearization error and indentifies and processes printing errors in a parallel manner during saving and interpreting stream data.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relates to a PDF image forming system and method configured to interpret and print all PDF formats including non-linearized and linearized PDF formats. The exemplary system and method provides a linearized PDF format detection and conversion mechanism in different devices in the printing pipeline wherein use of the detection and conversion mechanisms depend on the PDF print flows. The linearization detection in the printer firmware happens on the fly when receiving stream data and there is no need to wait after the PDF file is saved. This allows a decision to be made in an optimal manner. For a linearized PDF file, the exemplary system and method checks the size difference between a total file size and a first page size ($1^{st}$PgSize). If a size difference is detected above a predetermined value, linearized processing may be used to save file storage time spent for later pages. Otherwise, non-linearized processing may be used. In linearized PDF processing, two processing stages may be introduced to seek parallel processing for fast printing. The linearized stage1 may include saving the $1^{st}$ page data to RAM and interpreting $1^{st}$ page data so that $1^{st}$ page printing does not need to wait until all the data is received. Linearized stage 2 may include saving and interpreting the later page data. As a result, $1^{st}$ page printing speed may be optimized as well as the whole printing speed of the PDF document. The exemplary system and method may provide an error handling mechanism for interpreting PDF files that may avoid printing false error pages. The linearized specific error caused by un-known file size during the $1^{st}$ page interpreting may be detected and non-linearized interpreter may be used to avoid print the error page.

Figure 1:
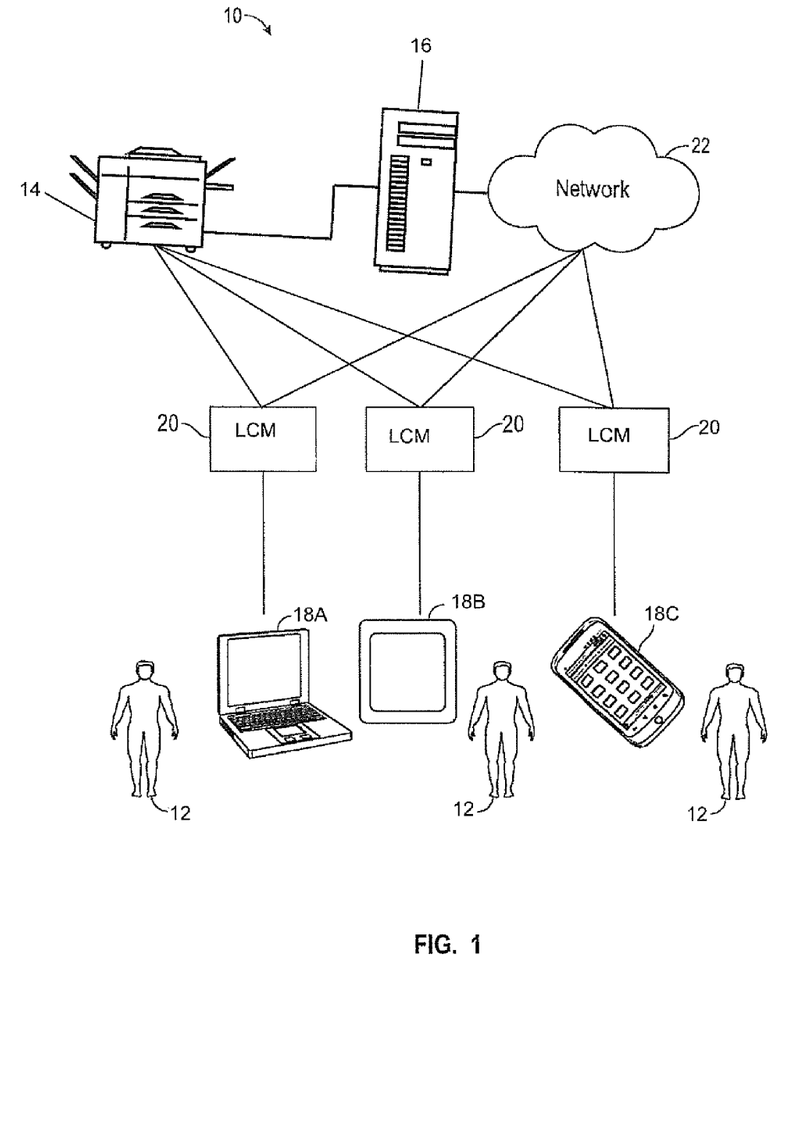
FIG. 1 is a diagram of an exemplary system for printing linearized and non-linearized PDF files according to one aspect of the present application.

Referring now to FIG. 1, a system 10 may be shown. The system 10 may be configured to interpret and print all PDF formats including non-linearized and linearized PDF files at an optimal printing speed. The system 10 provides a linearized PDF format detection and conversion mechanism in different devices in the print pipeline base on different PDF printing flows. The system 10 may have an error handling mechanism to avoid printing false error pages which may occur during linearization processing of a PDF file. The components of the system 10 may be coupled through wired or wireless connections.

The system 10 may have an image forming device 14. The image forming device 14 may be any type of device having printing capabilities. For example, the image forming device 14 may be a printer, a copier, a fax machine, a multi-function peripheral including a scanner and one or more of functions of a copier, a facsimile device, and a printer and/or other types of rendering devices. The image forming device 14 may be used for outputting a print job as described below.

The image forming device 14 may be coupled to a print server 16. The print server 16 may be used to connect the image forming device 14 to one or more computing devices 18 over a network 22. The network 22 may be a local area network (LAN), a general wide area network (WAN), wireless local area network (WLAN) and/or a public network. The print server 16 may accept print jobs from the computing device 18 and may send the print jobs to the appropriate image forming device 14. The print server 16 may queue the jobs locally as print jobs may arrive more quickly than the image forming device 14 may be able to print. Alternatively, or in addition to, the computing device 18 may be directly coupled to the image forming device 14.

Individuals 12 may use one or more computing devices 18 to send print jobs to the image forming device 14. The computing devices 18 may be a client computer system such as a desktop computer, handheld or laptop device, tablet, mobile phone device, server computer system, multiprocessor system, microprocessor-based system, network PCs, and distributed cloud computing environments that include any of the above systems or devices, and the like. The computing device 18 may be described in the general context of computer system executable instructions, such as program modules, being executed by a computer system as may be described below. In the embodiment shown in FIG. 1, the computing device 18 may be seen as a desktop/laptop computing system 18A, a tablet device 18B and a mobile phone device 18C. However, this should not be seen in a limiting manner as any computing device 18 described above may be used.

The computing devices 18 may be loaded with an operating system. The operating system of the computing device 18 may manage hardware and software resources of the computing device 18 and provide common services for computer programs running on the computing device 18. The computing device 18 may be loaded with a linear conversion module 20. The linear conversion module 20 may convert non-linear PDF files to linear PDF files as will be described below.

Figure 2:
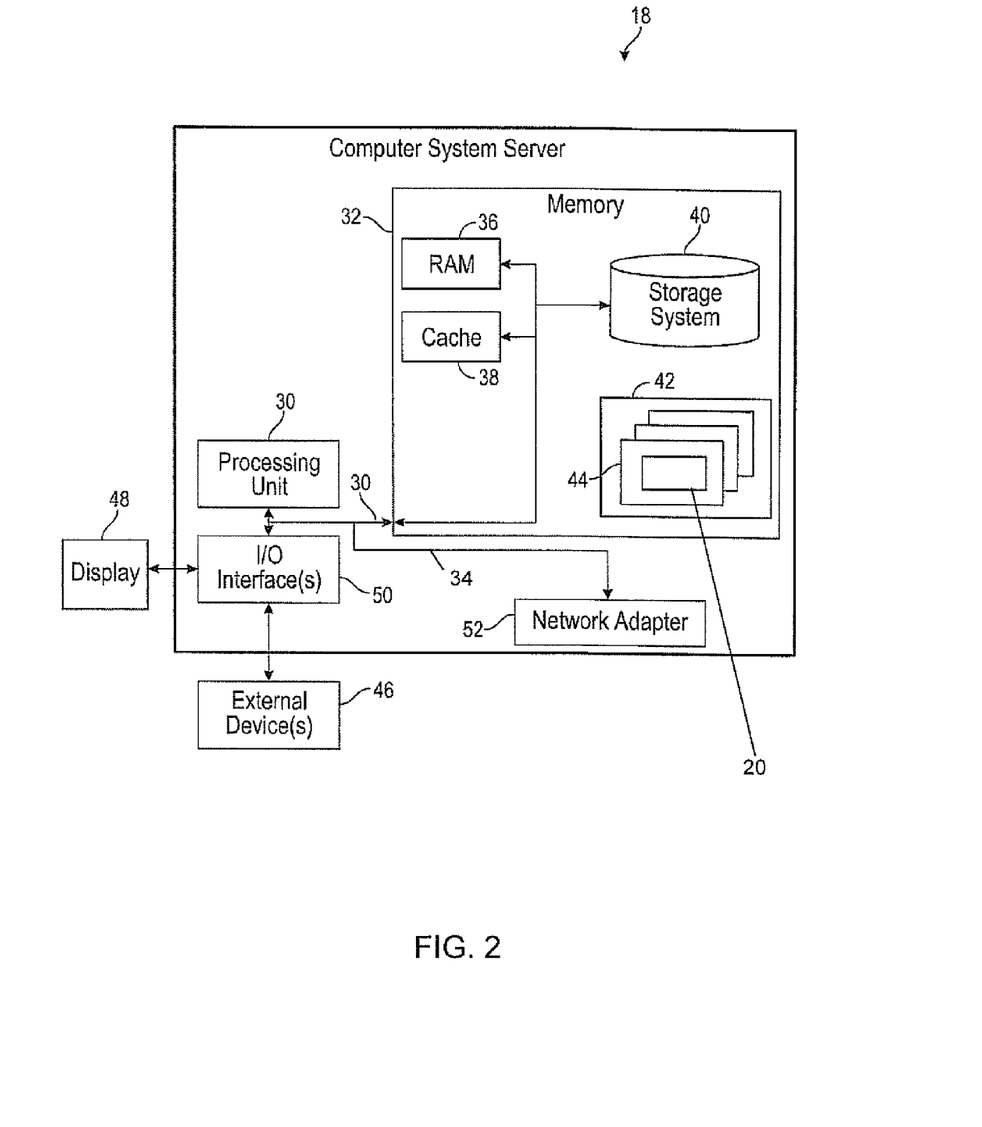
FIG. 2 is a simplified block diagram showing an illustrative computing device depicted in FIG. 1 in accordance with one aspect of the present application.

Referring now to FIG. 2, the computing device 18 may be described in more detail in terms of the machine elements that provide functionality to the systems and methods disclosed herein. The components of the computing device 18 may include, but are not limited to, one or more processors or processing units 30, a system memory 32, and a system bus 34 that couples various system components including the system memory 32 to the processor 30. The computing device 18 may typically include a variety of computer system readable media. Such media may be chosen from any available media that is accessible by the computing device 18, including non-transitory, volatile and non-volatile media, removable and non-removable media. The system memory 32 could include one or more personal computing system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, the program modules 44 may have the linear conversion module 20. In accordance with one embodiment, the linear conversion module 20 may form part of a printer driver stored in the system memory 32 of the computing device 18.

The computing device 18 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the computing device 18 to communicate with the image forming device 14 (FIG. 1). Such communication may occur via Input/Output (I/O) interfaces 50. Alternatively, the personal computing system 18A may communicate with one or more networks 22 (FIG. 1) such as a local area network (LAN), a general wide area network (WAN), and/or a public network via a network adapter 52. The computing device 18 may be coupled to the one or more networks via a wired or wireless connection. As depicted, the network adapter 52 may communicate with the other components of the computing device 18 via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
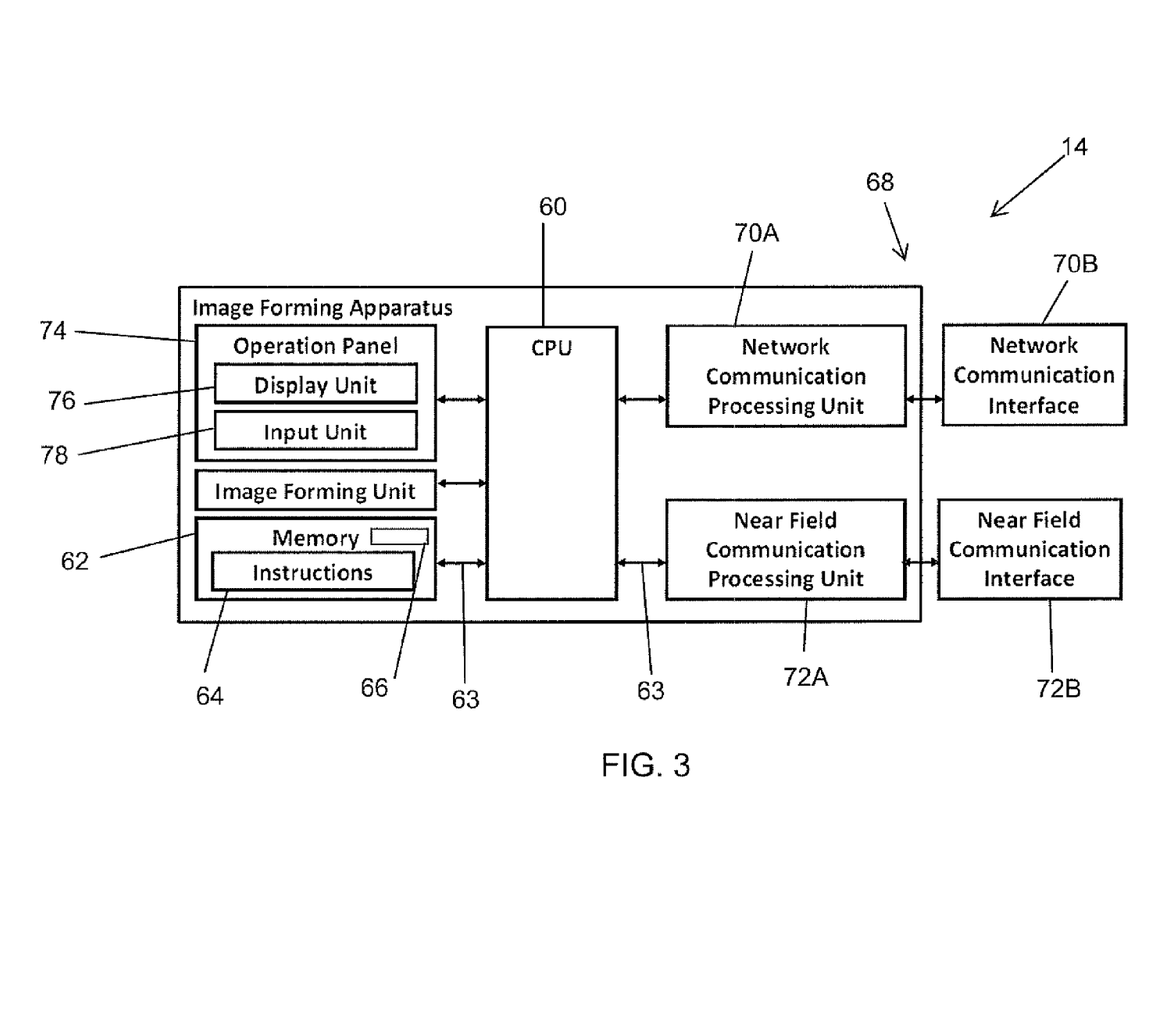
FIG. 3 is a simplified block diagram showing an illustrative image forming device depicted in FIG. 1 according to one aspect of the present application.

Referring now to FIG. 3, the image forming device 14 may be described in more detail in terms of the machine elements that provide functionality to the systems and methods disclosed herein. The components of the image forming device 14 may include, but are not limited to, one or more processors or processing units 60, a system memory 62, and a system bus 63 that may couple various system components including the system memory 62 to the processor 60. The image forming device 14 may typically include a variety of computer system readable media. Such media could be chosen from any available media that is accessible by the image forming device 14, including non-transitory, volatile and non-volatile media, removable and non-removable media. The system memory 62 could include one or more image forming device readable media in the form of volatile memory, such as a random access memory (RAM) and/or a cache memory. By way of example only, the system memory 62 may be provided for reading from and writing to a non-removable, non-volatile magnetic media device typically called a "hard drive".

The system memory 62 may include at least one program product/utility 64 having a set (e.g., at least one) of program modules 66 that may be configured to carry out the functions of embodiments of the invention. The program modules 66 may include, but is not limited to, an operating system, one or more application programs, other program modules, and program data. Each of the operating systems, one or more application programs, other program modules, and program data or some combination thereof, may include an implementation of a networking environment. The program modules 66 may include procedures such as a page converter, rasterizer, compression code, page print scheduler, print engine manager, and similar printing applications (i.e., printer firmware). The program modules 66 generally carry out the functions and/or methodologies of embodiments of the invention as described herein.

The image forming device 14 may have one or more communication modules 68. The communication modules 68 may allow the image forming device 14 to communicate with one or more networks (i.e., network 22 shown in FIG. 1) such as a local area network (LAN), a general wide area network (WAN), wireless local area network (WLAN) and/or a public network. In accordance with one embodiment, the communication modules 68 may include a network communication processing unit 70A coupled to a network communication interface 70B. The network communication processing unit 70A and the network communication interface 70B may allow the image forming device 14 to communicate with one or more networks 22. These networks 22 may be a local area network (LAN), a general wide area network (WAN), a wireless local area network, a public network, a cellular network as well as other type of networks. The communication modules 68 may include a near field communication processing unit 72A coupled to a near field communication interface 72B. The near field communication processing unit 72A and the near field communication interface 72B may allow the image forming device 14 to communicate with other electronic devices located near the image forming device 14 using Bluetooth, infrared or similar wireless communication protocols.

The image forming device 14 may include an operation panel 74. The operation panel may include a display unit 76 and an input unit 78 for facilitating human interaction with the image forming device 14. The display unit 76 may be any electronic video display, such as a LCD display, LED display and similar display types. The input unit 78 may include any combination of devices that allow users to input information into the operation panel 74, such as buttons, a keyboard, switches, and/or dials. In addition, the input unit 78 may include a touch-screen digitizer overlaid onto the display unit 76 that can sense touch and interact with the display unit 76.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, system memory 62) may be utilized. In the context of this disclosure, a computer readable storage medium may be any tangible or non-transitory medium that can contain, or store a program (for example, the program module 66) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 4:
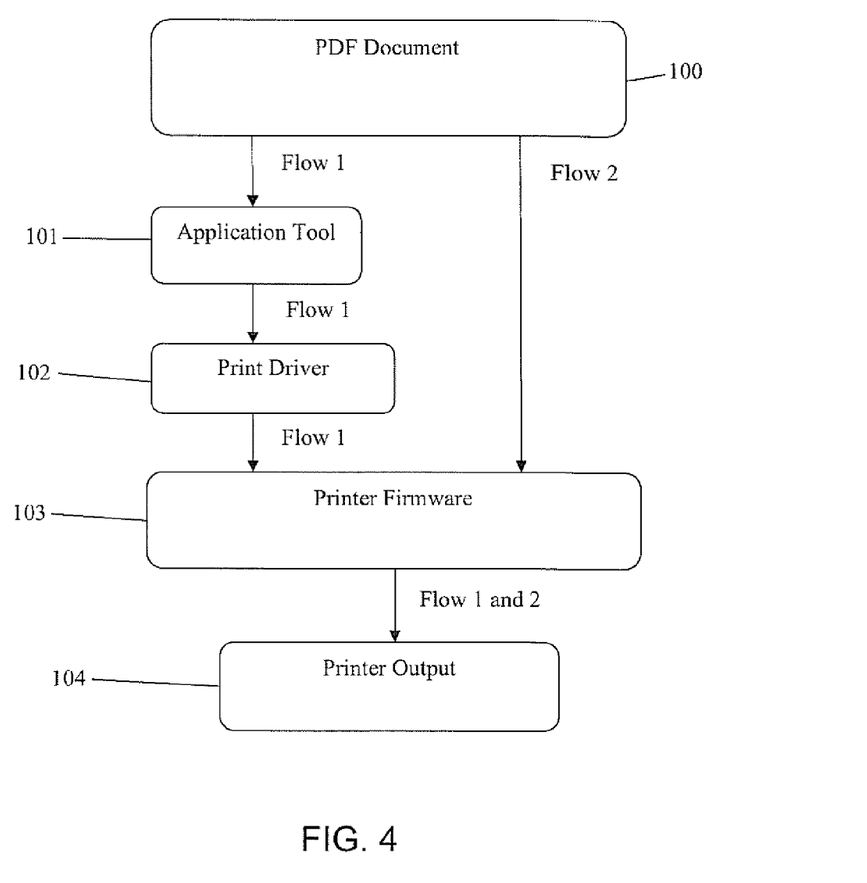
FIG. 4 is an exemplary embodiment of a flowchart depicting a method for printing linearized and non-linearized PDF files according to one aspect of the present application.
Figure 5:
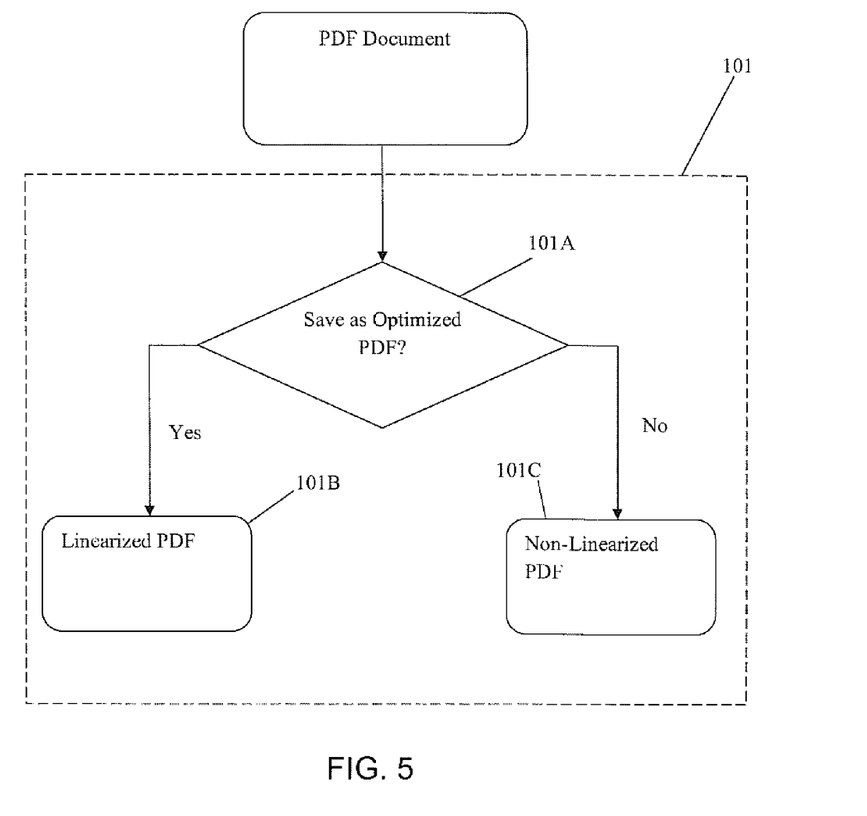
FIG. 5 is an exemplary embodiment of a flowchart depicting operation of an application tool used in the system of FIG. 1 according to one aspect of the present application.

Referring now to FIGS. 1-12B, operation of the system 10 in accordance with one exemplary embodiment may be seen. As shown in FIG. 4, operation of the system 10 may be based on how the PDF file is being sent to the image forming device 14. The operation of the system 10 may be divided into two process flows. Flow 1 may be defined as when a PDF document is opened in an application tool such as Adobe® Reader, Adobe® Pro, Microsoft® Office and the like and is sent to print via a printer driver. Flow 2 may be defined as when a PDF document is directly sent to print via network or USB printing.

In Flow 1, a PDF application tool may be used to open a PDF document as shown in 101. As may be seen in FIG. 5, the individual 12 who opened the PDF file in the application tool may need to determine if the application tool contains a linearized PDF converter as shown in 101A. Some application tools such as Acrobat Pro, Microsoft Word, and the like, may have file saving options which may allow the individual 12 to save the PDF file under a linearized PDF file standard. Thus, these application tools may allow the individual 12 to convert a non-linearized PDF file to a linearized PDF file inside the application tool. If the application tool has a linearized PDF converter, the individual 12 should linearize the PDF file as shown in 101B by saving the PDF file as a linearized PDF file. Saving the PDF file as a linearized PDF file may optimize the printing performance of the PDF file since the image forming device 14 may start interpreting and printing the $1^{st}$ page data of the PDF file without having to wait to receive the whole page data. Linearizing the PDF file in the application tool may further allow a linearized process flow for later printing pipeline uses. However, some application tools such as Adobe® Reader may not provide a linearized PDF converter. Thus, if the PDF file is a non-linearized PDF file, the PDF file may remain a non-linearized PDF file as shown in 101C.

The data from the PDF file may be sent to a printer driver of the computing device 18 as shown in 102 (FIG. 4). As may be seen in FIG. 6, the printer driver may receive the data from the PDF file as shown in 102A. The printer driver may review the data to check the PDF file size as shown in 102B. This information may be used by the printer driver as well as firmware stored in the memory 62 (FIG. 3) of the image forming device 14 (FIG. 1, 3) as will be discussed below.

The PDF data may be sent to the linearized PDF converter 20 (FIG. 1, 2) of the printer driver as shown in 102C. The linearized PDF converter 20 of the printer driver my review the PDF date to make a determination of whether the PDF file is linearized or non-linearized as shown in 102D. If the PDF file is a non-linearized PDF file, linearized PDF converter 20 of the printer driver may linearize the PDF file as shown in 102E.

Figure 6:
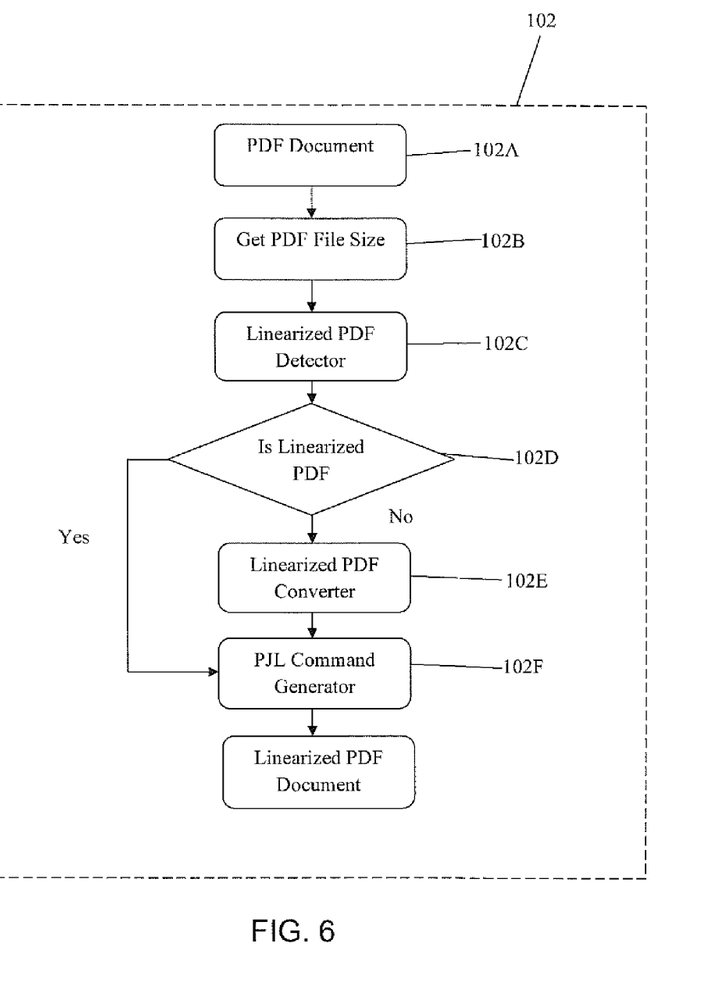
FIG. 6 is an exemplary embodiment of a flowchart depicting operation of a printer driver used in the system of FIG. 1 according to one aspect of the present application.

The printer driver may have a Print Job Language (PJL) command module as shown in 102F. The PJL command module may be used to generate PJL commands. For example, the PJL command module may generate PJL commands for the file size and linearization information. In accordance with one embodiment, if the linearized PDF converter 20 of the printer driver linearizes the PDF file, the PJL command module may send the following PJL commands to printer firmware in the image forming device 14:

@PJL SET LPARM:PDF KLINEARIZEDPDF=YES
@PJL SET LPARM:PDF KFILESIZE=PDF FILE SIZE

If the PDF file is a linear PDF file, the PDF file may be sent directly to the PJL command module as shown in 102E without passing though linearized converter 20. After the PJL commands are generated, the PDF file, which is already linearized, may be sent to the image forming device 14 as shown in 103 (FIG. 4). In accordance with one embodiment, the PJL command module may send the following PJL commands to printer firmware in the image forming device 14:

@PJL SET LPARM:PDF KLINEARIZEDPDF=NO
@PJL SET LPARM:PDF KFILESIZE=PDF FILE SIZE

As may be seen in FIG. 4, for flow 2 printing, the PDF file may be sent directly to the image forming device 14 as shown in 103. Since in flow 2 the PDF document is directly sent to print via network or USB printing, flow 2 does not use the application tool or printer driver. Thus, in flow 2, printer firmware in the image forming device 14 may need to handle all input formats.

Figure 7:
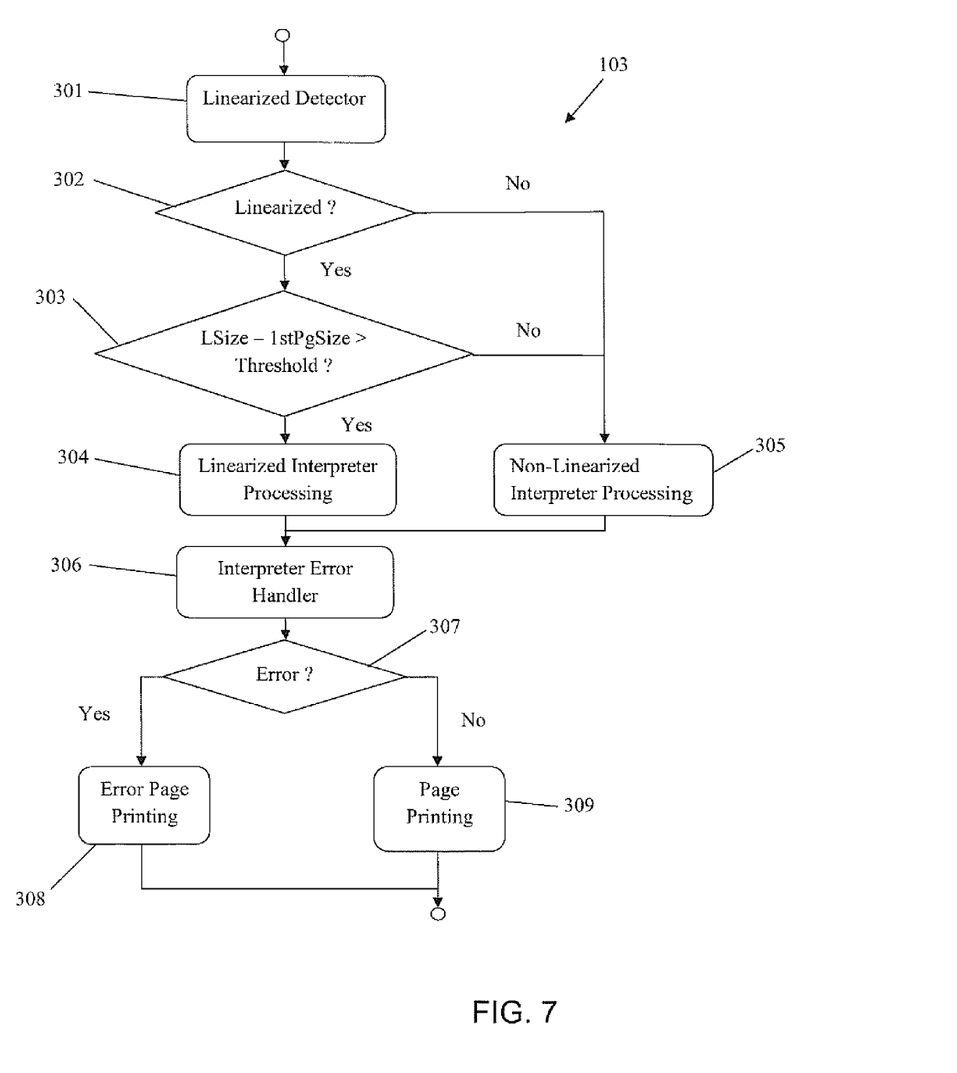
FIG. 7 is an exemplary embodiment of a flowchart depicting operation of printer firmware used in the system of FIG. 1 according to one aspect of the present application.

The printer firmware may be used for both flow 1 and flow 2. As shown in FIG. 7, the operation of the printer firmware of the image forming device 14 as shown in 103 (FIG. 4) may be seen. The printer firmware of the image forming device 14 may perform a linearized detection of the PDF file received as shown in 301. The printer firmware may determine if the PDF file is linearized as shown in 302. The printer firmware may check to see if any PJL commands have been received. In accordance with one embodiment, the printer firmware may check the PJL KLINEARIZEDPDF setting to find out if a linearization check was done in the printer driver or not. If a linearization check is done in the printer driver, the printer firmware may start saving stream data based on the KLINEARIZEDPDF setting, otherwise, the printer firmware may perform the linearization detection to determine the PDF file type as shown in 301.

Figure 8:
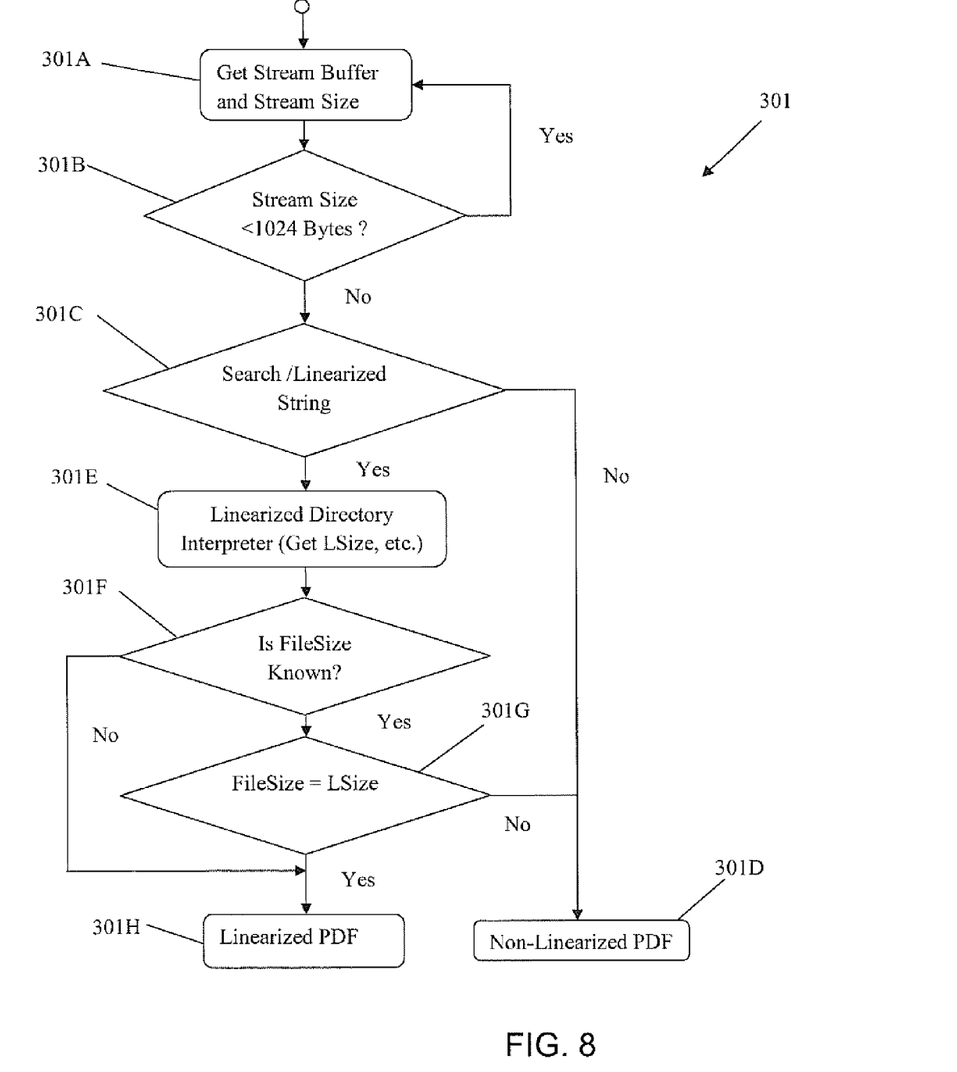
FIG. 8 is an exemplary embodiment of a flowchart depicting a operation of a linearized detector used in the printer firmware of FIG. 7 according to one aspect of the present application.

The printer firmware may start to detect the linearization while it is receiving stream data instead of after saving all of the stream data into the image forming device 14. This may allow the image forming device 14 to optimize the speed to start $1^{st}$ page printing. As shown in FIG. 8, the image forming device 14 may start to receive the stream data. The printer firmware may determine if the image forming device 14 has received 1024 bytes of stream data as shown 301B. If the less than 1024 bytes of stream data have been received, the image forming device 14 may continue to receive the stream data. The printer firmware may start to do linearized detection after receiving 1024 bytes of stream buffer (Per PDF specification, the linearization parameter dictionary should be located within 1024 bytes). Linearized detection may occur by using the stream buffer and reviewing the data to search for "/Linearized" key words and parameter information (i.e., linearized key string) contained within the linearization parameter dictionary as shown in 301C. If the linearized key string is not found, the PDF file is a non-linearized PDF file as shown in 301D. If the string is found, the printer firmware may try and interpret the linearization parameter directory as shown in 302E. The printer firmware may try to interpret the linearized dictionary to see if a PJL specified file size (FileSize) is known as shown in 302F. If the FileSize is known, the printer firmware may compare the linearized specified file size (LSize) to the FileSize as shown in 302G. If the LSize is equal to the FileSize, the PDF file may be defined as a linearized PDF file as shown in 302H. Otherwise, the PDF file may be defined as a non-linearized PDF file as shown in 301D. If the FileSize is unable to be determine in no printer driver situation, the PDF file may still be defined as a linearized PDF file as shown in 302H.

Referring back to FIG. 7, if the PDF file is defined as a non-linearized PDF file, non-linearized processing may be applied to the PDF file as shown in 305. As may be seen in FIG. 9, for non-linearized processing of the PDF file, the whole PDF file is saved in system memory 62 of the image forming device 14 as shown in 501. Once the PDF file is saved, it is interpreted and print data is generated as shown in 502.

If the PDF file is defined as a linearized PDF file, the firmware of the image forming device 14 may check the size difference between LSize and 1stPgSize which are specified by linearization parameter dictionary as shown in 303. If the size difference between LSize and 1stPgSize is bigger than a predetermined threshold size (ThresholdSize), linearized processing may be applied to the PDF file as shown in 304. If the size difference between LSize and 1stPgSize is smaller than a predetermined ThresholdSize, non-linearized processing may be applied as shown 305. Non-linearized processing may be applied since when the size difference is smaller than a predetermined threshold value, there is no need to have two (2) stage processing as may be applied to linearized processing as disclosed below since the time savings for printing may be minimal.

For PDF files identified as linearized, linearized processing may be performed as shown in 304 of FIG. 7. As may be seen in FIG. 10 for 304, stream data may be sent to a stream storage task generator as may be seen in 401. The stream storage task generator may divide the linearized processing into two stages. Stage 1 may involve $1^{st}$ page stream storage and interpreting. Stage 2 may be involved with storage and interpreting of later pages. As may be seen in FIG. 10, stage 1 and stage 2 may be processed in a parallel way. This may improve the $1^{st}$ page printing speed significantly as it does not need to wait until all data is saved.

Figure 10:
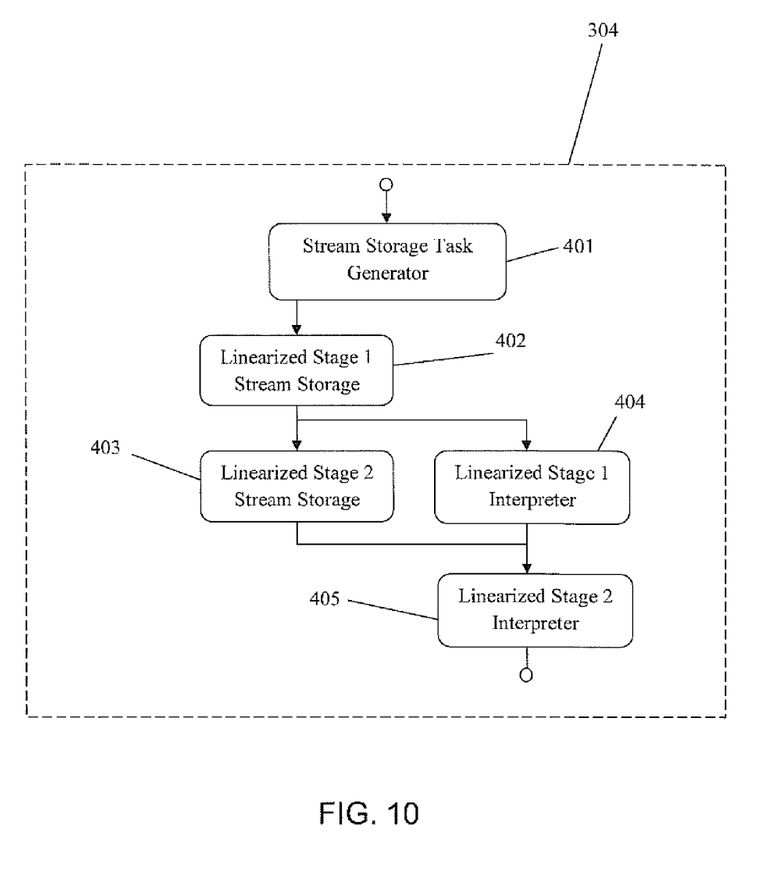
FIG. 10 is an exemplary embodiment of a flowchart depicting linearized processing of the PDF file by the printer firmware of FIG. 7 according to one aspect of the present application.

In accordance with one embodiment, stage 1 may involve $1^{st}$ page stream storage as shown in 402. While the $1^{st}$ page stream data is being processed as shown in 404, stream storage of later pages may be done as shown in 403 in a parallel manner. The later page data may then be interpreted as shown in 405.

In accordance with one embodiment, the stage 1 $1^{st}$ page stream data may be saved in the RAM memory at fast speed even if the system memory device is a hard drive. This is because accessing RAM may be faster than accessing the hard drive. However, when stage 1 $1^{st}$ page stream data size is bigger than available RAM size, the $1^{st}$ page stream data may be saved into the hard drive or other memory storage device. The RAM memory buffer may be used directly by the linearized $1^{st}$ page interpreter, which may reduce temp memory buffer that is required by using the hard drive.

Figure 9:
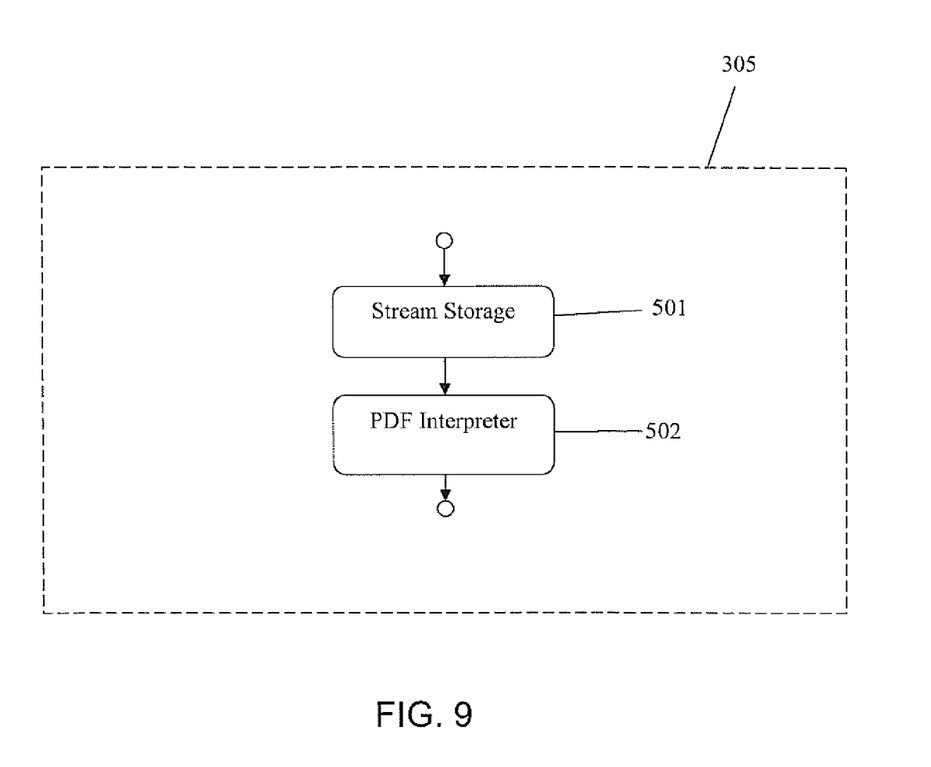
FIG. 9 is an exemplary embodiment of a flowchart depicting non-linearized processing of the PDF file by the printer firmware of FIG. 7 according to one aspect of the present application.

In 404, the linearized stage 1 interpreter may utilize interpreting information such as XREF table and page information directly from the linearization parameter dictionary. This may result in faster interpreting speed compared to the non-linearized interpreter shown in 502.

If any error happens during saving stream data and interpreting, an error page may be printed to notify the individual 20 with error information such as no memory, lack of fonts etc. However, there may be a special case which produces a false error due to linearization processing. This is the case where the size specified by the linearization parameter dictionary does not match the real file size. The printer firmware of the present application may provide an interpreter error handler for the above error case without printing false error page as shown in 306.

Figure 11:
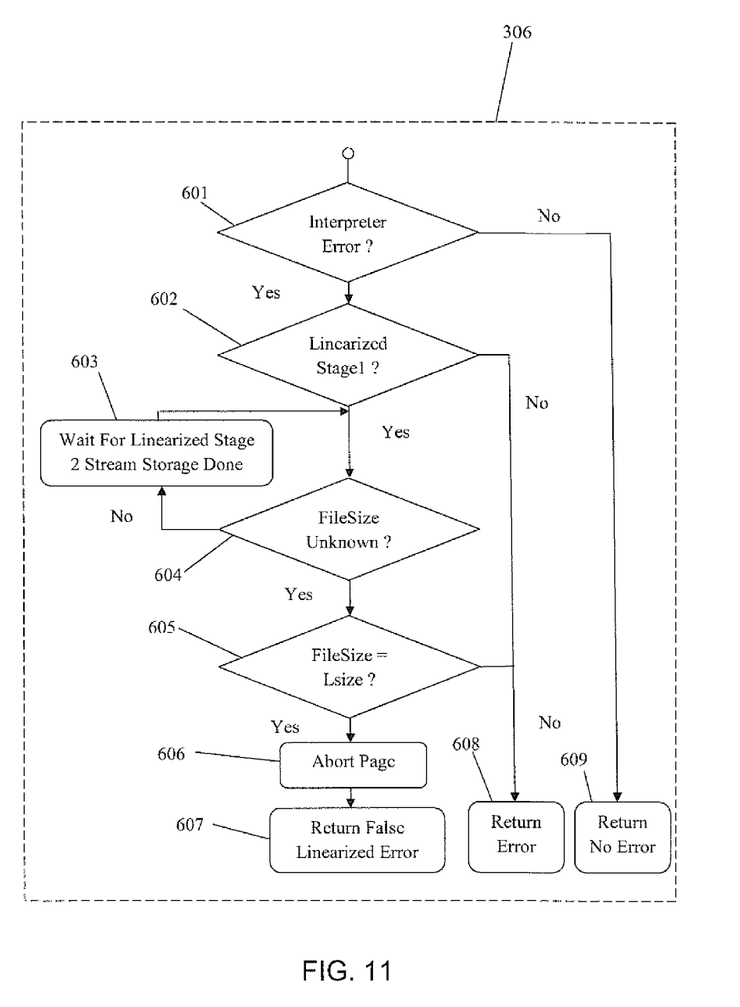
FIG. 11 is an exemplary embodiment of a flowchart depicting operation of an error handling mechanism used in the printer firmware of FIG. 7 according to one aspect of the present application.

As may be seen in FIG. 11, operation of the interpreter error handler is shown. The interpreter error handler determines if there is an interpreter error as may be seen in 601. If there is no interpreter error, no error message is returned as shown in 609. When interpreter error handler identifies an error, the interpreter error handler determines if it is in linearized Stage 1 as shown in 602. If it is not, an error message is returned as shown in 608. If it is a linearized stage 1 error, the interpreter error handler determines the file size setting as shown in 604. If file size is known already, then the interpreter error handler checks if file size matches linearization parameter dictionary specified size LSize as shown in 605. If it does match, then the error is a real error and an error is returned as shown in 608. Otherwise, it is False Linearized Error. In this situation, printing of an error page may be aborted as shown in 606 and a return of a false linearized error maybe reported as shown in 607. If file size is unknown, the printer firmware may wait until saving stage 2 stream data is done as shown in 603 in order to get the file size. If fileSize matches LSize, a true PDF interpreting error may be returned as shown in 608.

Figure 12A:
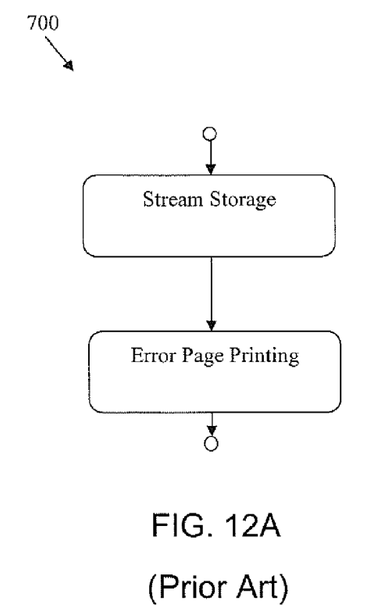
FIG. 12A is a prior art flowchart depicting error page printing by the printer firmware according to one aspect of the present application.
Figure 12B:
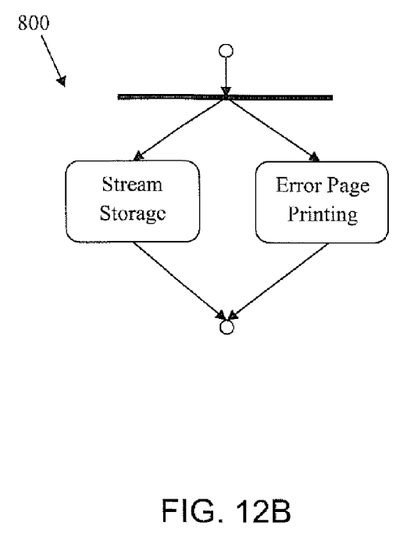
FIG. 12B is an exemplary embodiment of a flowchart depicting error page printing by the printer firmware of FIG. 7 according to one aspect of the present application.

Referring to FIG. 12A, presently, when an error is detected, the error page may be printed after stream data storage is completed as shown in 700. However, the printer firmware may be configured so that the PDF interpreter task and PDF stream storage task use different task threads as shown in 800 of FIG. 12B. In case an error is recorded before stream storage data has been completed, two separate task threads may be used to handle error page printing and consuming the rest of the stream data at the same time. Thus, stream storage and error page printing may be processed in parallel. This may improve error job printing performance as it may be done more timely as opposed to the prior art where the error page may be printed only after stream data storage is completed.

The foregoing description is illustrative of particular embodiments of the invention, but is not meant to be a limitation upon the practice thereof. The following claims, including all equivalents thereof, are intended to define the scope of the invention.

What is claimed is:

1. A method of processing linearized and non-linearized Portable Document Format (PDF) files for printing comprising:
   determining by printer firmware if a printer driver detected that the PDF file is linearized;
   saving stream data of the PDF file by the printer firmware when the printer firmware determines the printer driver detected that the PDF file is linearized; and
   determining by the printer firmware if the PDF file is linearized when the PDF file is sent directly to a printer having the printer firmware, wherein the determining by the printer firmware if the PDF file is linearized comprises:
   monitoring a first portion of the stream data of the PDF file received by the printer firmware for a linearized key string;
   interpreting the linearized key string if the linearized key string is found;
   processing the PDF file as linearized when the linearized key string is found, wherein processing the PDF file as linearized when the linearized key string is found comprising:
   comparing a size difference between a linearized specific file size of the PDF file and a first page file size of the PDF file;
   processing the PDF file as linearized when the size difference between the linearized specific file size of the PDF file and the first page file size of the PDF file is greater than a threshold size; and
   processing the PDF file as non-linearized when the size difference between the linearized specific file size of the PDF file and the first page file size of the PDF file is less than a threshold size; and
   processing the PDF file as non-linearized when the linearized key string is unidentified in the first portion of the PDF file received.

2. The method of claim 1, wherein monitoring a first portion of the stream data of the PDF file received by the printer firmware for a linearized key string comprises monitoring by the printer firmware for the linearized key string after receiving 1024 bytes of stream data of the PDF file.

3. The method of claim 1, wherein interpreting the linearized key string comprises comparing a linearized specific file size of the PDF file to an actual file size of the PDF file.

4. The method of claim 1, wherein processing the PDF file as linearized when the size difference between the linearized specific file size of the PDF file and the first page file size of the PDF file is greater than a threshold size comprises:
   storing and interpreting first page stream data of the PDF file; and
   storing and interpreting non-first page stream data of the PDF file.

5. The method of claim 1, wherein processing the PDF file as linearized when the size difference between the linearized specific file size of the PDF file and the first page file size of the PDF file is greater than a threshold size comprises:
   storing a first page stream data of the PDF file;
   interpreting first page stream data of the PDF file;
   storing non-first page stream data of the PDF file; and
   interpreting non-first page stream data of the PDF file;
   wherein interpreting first page stream data of the PDF file and storing non-first page stream data of the PDF file is done in parallel.

6. The method of claim 5, wherein storing first page stream data of the PDF file comprises storing the first page stream data of the PDF file in Random Access Memory (RAM), the first page stream data of the PDF file being stored in other system memory when the RAM is full or the RAM is unavailable.

7. The method of claim 5, wherein interpreting first page stream data of the PDF file interpreting data directly from information in a linearization parameter dictionary.

8. The method of claim 1, comprising:
   monitoring for a processing error when processing the PDF file as linearized;
   comparing a file size of the PDF file to the linearized specific file size of the PDF file when the processing error occurs;
   sending an error message when the file size of the PDF file is equal to the linearized specific file size of the PDF file; and
   aborting the sending of the error message, terminating the linearized processing and re-processing the PDF file as non-linearized when the file size of the PDF file and the linearized specific file size of the PDF file is unequal and above a predetermined threshold limit.

9. The method of claim 1, comprising detecting an error, wherein two separate task threads are used to handle error page printing and consuming a remainder of stream storage when the error is recorded prior to stream storage being completed.

10. The method of claim 1, comprising:
    determining by the printer driver if the PDF file is linearized when the PDF file is sent to print via the printer driver; and
    linearizing the PDF file by the printer driver when the PDF file is non-linearized.

11. The method of claim 10, comprising:
    adding printer command information to the PDF file by the printer driver; and sending the printer command information by the printer driver to the printer firmware.

12. The method of claim 11, wherein the printer command information comprises file size data and linearization data.

13. The method of claim 1, comprising:
opening the PDF file in a PDF application; and
saving the PDF file as a linearized PDF file when the PDF application has a linearization module.

14. A method of processing linearized and non-linearized Portable Document Format (PDF) files for printing comprising:
determining by the printer driver if the PDF file is linearized if the PDF file is sent to print via the printer driver;
linearizing the PDF file by the printer driver when the PDF file is non-linearized;
adding printer command information to the PDF file by the printer driver;
sending the printer command Information by the printer driver to printer firmware;
determining by printer firmware if the printer driver detected that the PDF file is linearized;
saving stream data of the PDF file by the printer firmware when the printer firmware determines the printer driver detected that the PDF file is linearized;
determining by the printer firmware if the PDF file is linearized when the PDF file is sent directly to a printer having the printer firmware;
identifying a linearization error by the printer firmware, wherein identifying a linearization error by the printer firmware comprises:
comparing a file size of the PDF file to a linearized specific file size of the PDF file;
sending an error message when the file size of the PDF file is equal to the linearized specific file size of the PDF file; and
aborting the sending of the error message, terminating the linearized processing and re-processing the PDF file as non-linearized when the file size of the PDF file and the linearized specific file size of the PDF file is unequal and above a predetermined threshold limit; and
identifying and processing printing errors during saving and interpreting stream data by the printer firmware in a parallel manner.

15. The method of claim 14, wherein identifying and processing printing errors during saving and interpreting stream data by the printer firmware in a parallel manner comprises processing two separate task threads to handle error page printing and consuming a remainder of stream storage when the error is recorded prior to stream storage being completed.

16. A system for processing linearized and non-linearized Portable Document Format (PDF) files for printing comprising:
a printer driver module receiving the PDF file when the PDF file is sent to print via the printer driver, determining if the PDF file is linearized by analyzing PDF data of the PDF file, linearizing the PDF file when the PDF file is non-linearized, and adding printer command information to the PDF file when linearizing the PDF file;
a printer firmware module determining if the printer driver detected that the PDF file is linearized, when receiving the PDF file directly, processing the PDF file as linearized when a size difference between a linearized specific file size of the PDF file and a first page file size of the PDF file is greater than a threshold size, processing the PDF file as non-linearized when the size difference between the linearized specific file size of the PDF file and the first page file size of the PDF file is less than a threshold size, and processing the PDF file as non-linearized when a linearized key string is unidentified in the first portion of the PDF file received, wherein the printer firmware identifies real and false linearization error and indentifies and processes printing errors in a parallel manner during saving and interpreting stream data; and
an error detection module stored in the printer firmware module, the error detection module monitoring for a processing error when processing the PDF file as linearized, comparing a file size of the PDF file to the linearized specific file size of the PDF file, sending an error message when the file size of the PDF file is equal to the linearized specific file size of the PDF file, and processing the PDF file as non-linearized when the file size of the PDF file and the linearized specific file size of the PDF file is un-equal.

* * * * *